UNITED STATES PATENT OFFICE.

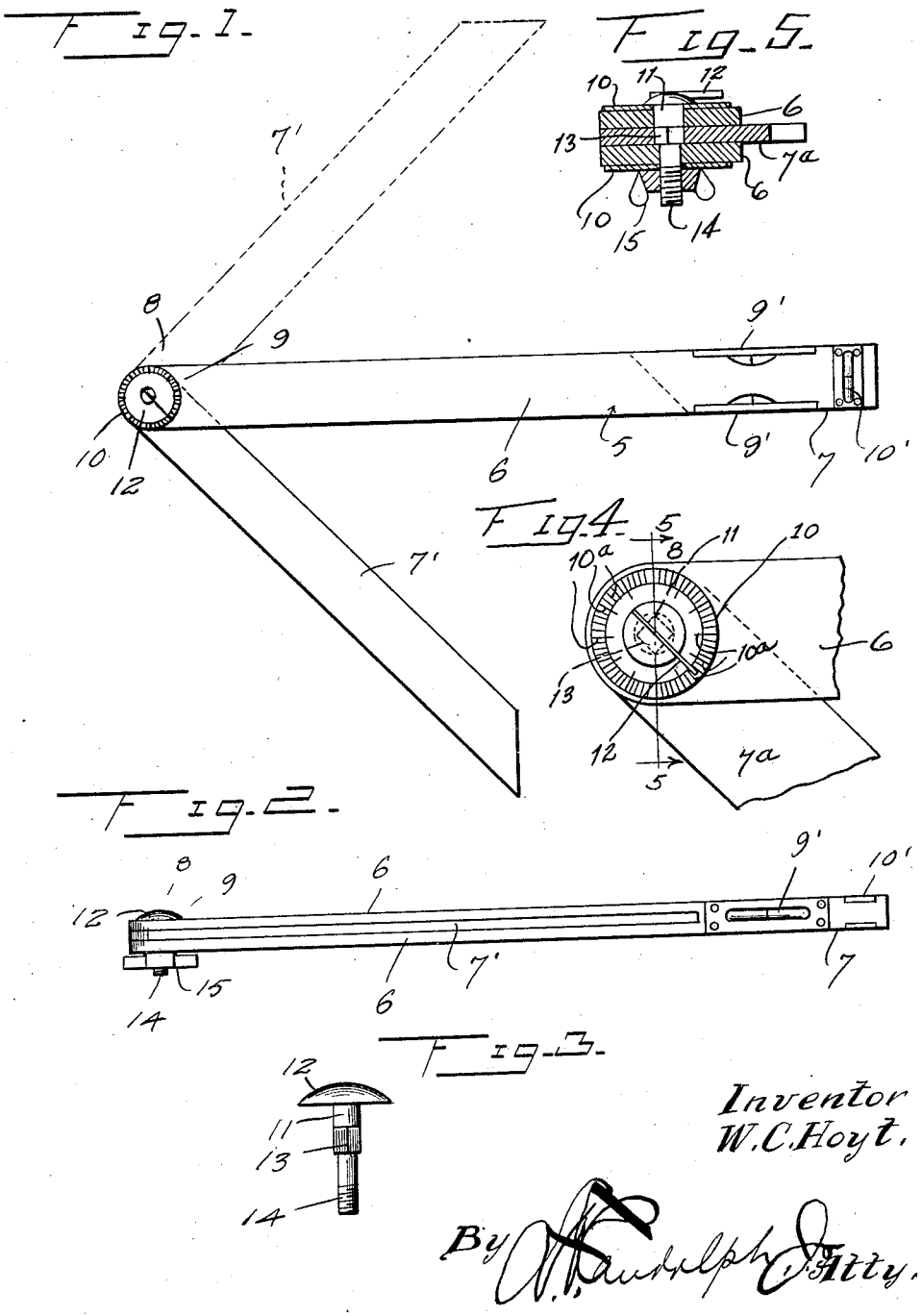

WILLIAM C. HOYT, OF SOUTH BEND, WASHINGTON.

COMBINATION LEVEL AND BEVEL.

1,393,533.  Specification of Letters Patent.  Patented Oct. 11, 1921.

Application filed July 19, 1919. Serial No. 312,012.

*To all whom it may concern:*

Be it known that I, WILLIAM C. HOYT, a citizen of the United States, residing at South Bend, in the county of Pacific and State of Washington, have invented certain new and useful Improvements in Combination Levels and Bevels; and I do hereby declare the following to be a full, clear, and exact description of the invention, such as will enable others skilled in the art to which it appertains to make and use the same.

My invention relates to improvements in bevel squares having means for indicating the angle and also a level in connection therewith.

An important object of this invention is to provide a level attachment for bevel squares which may be used in connection with the planking of the inside of a wooden ship though not necessarily restricted to such use.

A further object of the invention is to provide a bevel square having means for indicating the position of the arms of the square in relation to each other.

A further object of the invention is to provide a tool of the character described, which is simple, reliable, and cheap to manufacture.

Other objects and advantages of the invention will be apparent during the course of the following description.

In the accompanying drawings forming a part of this specification, and in which like numerals are employed to designate like parts throughout the same, Figure 1 is a side elevation of a tool embodied in my invention.

Fig. 2 is a plan view of the same, and,

Fig. 3 is a side elevation of a combined indicating and pivot element embodied in the invention.

Fig. 4 is a detail view, on an enlarged scale, showing clearly the pivoted end of the device.

Fig. 5 is a detail sectional view on the plane of line 5—5 of Fig. 4.

In the drawings wherein for the purpose of illustration is shown the preferred embodiment of my invention, the numeral 5 indicates the body of the tool which includes spaced parallel side members 6 formed integral with a head 7.

An arm 7' is secured to the ends of the side members 6 opposite the head 7 by a combined pivot and indicating element 8.

As indicated in Fig. 3 the combined pivot and indicating element 8 includes a shank 11 extended through one of the members 6 and provided with oppositely disposed indicating fingers 12. The fingers 12 are arranged on a dial 10 surrounding the shank and carried by one of the members 6. The shank 11 carries a squared portion 13 extending through a squared hole in the arm 7'. A movement of the arm 7' causes the fingers 12 to partake of a like movement on the dial and thereby indicate the angle of the pivoted arm. A reduced threaded extension 14 is provided on the squared portion and has threaded engagement with a thumb nut 15.

To dispense with the necessity of employing a spirit level in connection with my improved tool, I have provided spirit glasses 9' in opposite sides of the head 7. The outer portion of the head 7 is provided with a spirit level glass 10' adapted for coaction with the tool.

In the use of my invention, it will be apparent that the dial on the stock will accurately indicate the angle of the square and thereby dispense with the necessity of a degree board.

The provision of the level glasses in the head 7 will dispense with the necessity of using the usual level in connection with the tool.

While I have shown and described the preferred embodiment of my invention, it is understood that I may make such minor changes in arrangement and construction of parts, as will remain within the spirit of the invention and the scope of the appended claims.

Having thus described my invention what I claim is:

1. A square of the character described comprising a pair of spaced side members connected at one end to form a head, the inner end wall of the head being cut on an angle between said side members, a pivot member mounted for rotation through the opposite ends of said side members, said pivot member having a squared central portion, an arm mounted on said squared central portion and having an angularly cut free end for engagement with the said inner end of the head when said arm is in position between said side members, means for retaining said pivotal member in position in said side members, and means carried by said pivotal member and one of said side members to indicate the angular position of said arm.

2. A square of the character described comprising a pair of side members connected at one end to form a level carrying head, a pivotal member rotatably mounted through the opposite ends of said side members, one of said side members having a dial formed thereon with graduation marks around said pivotal member, an arm carried by said pivotal member and adapted to move with said pivotal member to various positions at different angles with respect to said side members, and fingers projecting radially from said pivotal member and adapted to ride over the graduations of said dial to indicate the angular position of said arm with respect to said side members.

In testimony whereof I affix my signature in presence of two witnesses.

WILLIAM C. HOYT.

Witnesses:
  F. E. PEARCE,
  P. W. RHODES.